(12) United States Patent
Aoki et al.

(10) Patent No.: US 7,218,798 B2
(45) Date of Patent: May 15, 2007

(54) OPTICAL DEFLECTION ELEMENT AND OPTICAL SWITCH

(75) Inventors: Tsuyoshi Aoki, Kawasaki (JP); Masao Kondo, Kawasaki (JP); Kazuaki Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/071,209

(22) Filed: Mar. 4, 2005

(65) Prior Publication Data

US 2006/0088240 A1 Apr. 27, 2006

(30) Foreign Application Priority Data

Oct. 26, 2004 (JP) ............................. 2004-311365

(51) Int. Cl.
 *G02F 1/295* (2006.01)
(52) U.S. Cl. ................................. 385/4; 385/8; 385/17
(58) Field of Classification Search ...................... None
 See application file for complete search history.

(56) References Cited

U.S. PATENT DOCUMENTS

| 4,762,383 | A | * | 8/1988 | Yamashita et al. ............. 385/7 |
| 5,185,829 | A | * | 2/1993 | Yamada et al. ................ 385/37 |
| 5,920,662 | A | * | 7/1999 | Hinkov ......................... 385/14 |
| 6,415,069 | B1 | * | 7/2002 | Chao et al. .................... 385/16 |
| 6,653,244 | B2 | * | 11/2003 | Behfar et al. ............... 438/780 |
| 6,795,601 | B1 | * | 9/2004 | Mitchell et al. .............. 385/15 |
| 6,898,362 | B2 | * | 5/2005 | Forbes et al. ................ 385/132 |
| 6,968,096 | B2 | * | 11/2005 | Kittaka et al. ................ 385/10 |
| 2002/0084446 | A1 | * | 7/2002 | Dalton et al. ................ 252/582 |

FOREIGN PATENT DOCUMENTS

| EP | 1452904 A2 * | 9/2004 | ................... 385/22 |
| JP | 3-87817 | 4/1991 | |
| JP | 2002-523802 | 7/2002 | |
| JP | 2002-303836 | 10/2002 | |
| JP | 2002-350908 | 12/2002 | |
| JP | 2003-215367 | 7/2003 | |
| WO | WO 00/11515 | 3/2000 | |

OTHER PUBLICATIONS

H. Kosaka, et al.; "Superprism phenomena in photonic crystals;" *Physical Review B*; vol. 58; No. 16; Oct. 15, 1998; pp. R 10096-RR10099.

H. Kosaka, et al.; "Self-collimating phenomena in photonic crystals;" *Applied Physics Letters*; vol. 74; No. 9; Mar. 1, 1999; pp. 1212-1214.

H. Kosaka, et al.; "Photonic crystals for micro lightwave circuits using wavelength-dependent angular beam steering;" *Applies Physics Letters*; vol. 74; No. 10; Mar. 8, 1999, pp. 1370-1327./.

* cited by examiner

*Primary Examiner*—Rodney Bovermick
*Assistant Examiner*—Mike Stahl
(74) *Attorney, Agent, or Firm*—Armstrong, Kratz, Quintos, Hanson & Brooks, LLP.

(57) ABSTRACT

An optical deflection element is configured to include a prism electrode provided on an optical waveguide, a first photonic crystal structure provided forward of the prism electrode in a light traveling direction being a position after a light passes through the prism electrode, a control electrode provided to confront a counter electrode layer via the optical waveguide on the first photonic crystal structure, and a second photonic crystal structure provided in the lateral direction of the prism electrode in parallel with the light traveling direction.

18 Claims, 4 Drawing Sheets

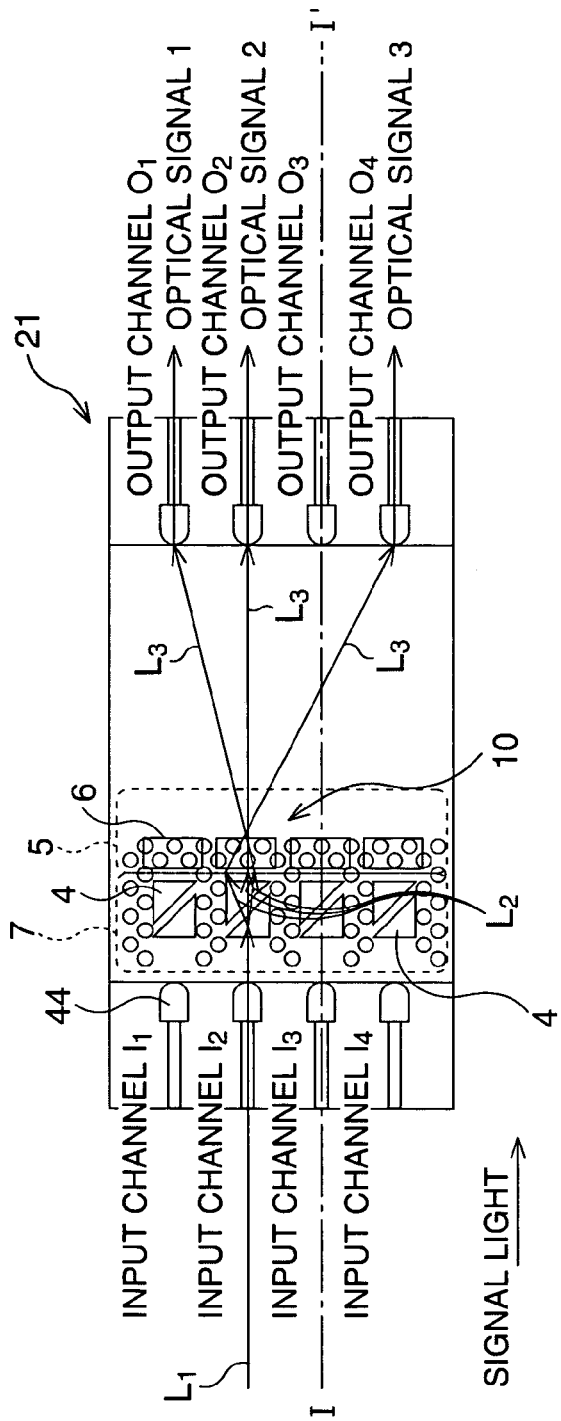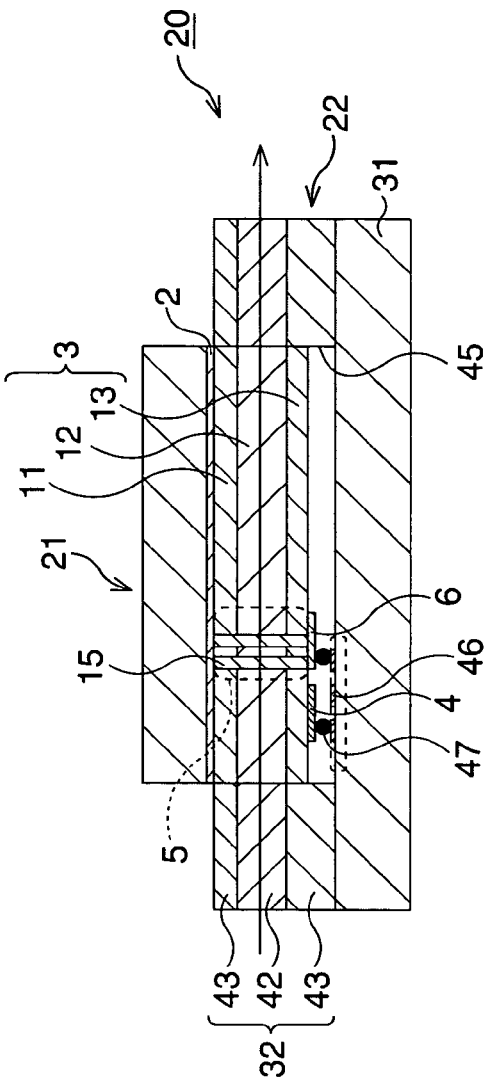

OPTICAL DEFLECTION ELEMENT AND OPTICAL SWITCH

CROSS-REFERENCE TO RELATED APPLICATIONS

This application is based upon and claims the benefit of priority from the prior Japanese Patent Application No. 2004-311365, filed on Oct. 26, 2004, the entire contents of which are incorporated herein by reference.

BACKGROUND OF THE INVENTION

1. Field of the Invention

The present invention relates to an optical deflection element deflecting a light and an optical switch outputting an inputted optical signal to a desired channel.

In recent years, a photonic network is increasingly demanded for high-speed driving and high-capacity more than ever, in which the optical signals have had a broadband and been multiplexed, and hence the transmission equipment of the photonic network is also demanded multichannel and high-speed driving as well. Also, an optical cross-connect equipment serving as a node of the photonic network is required to increase the number of channels and to switch at higher speed, and hence an optical switch for example of Japanese Patent Application Laid-Open No. Hei3-87817 (Patent Document 1) is needed as an alternative to current optical cross connect equipment using a mirror and supported by a micromachine such as MEMS (Micro Electro Mechanical Systems).

An optical switch using an optical waveguide is necessary to adjust an optical deflection angle along with the advance toward the high-speed driving and multichannel. For the optical switches using the optical waveguide, the use of so-called photonic crystals is closely watched, the photonic crystal being composed of plural kinds of substances having different refractive indexes and aligned periodically. The photonic crystal is a crystal structure composed of plural media having different refractive indexes aligned periodically. The photonic crystal is expected as an element technology capable of reducing the size of conventional optical devices to several microns. Inside the photonic crystals, depending on the alignment period, shape, refractive angles, and so forth, the photonic band structure is modulated in the same manner as the band structure of electrons in semiconductors or the like, so that a peculiar band structure is formed. For instance, a forbidden band referred to as a photonic band gap is formed in the vicinity of a Brillouin zone, and a light cannot exist inside the photonic crystal of such a frequency band. Further, the photonic band in the vicinity of the photonic band gap is largely modulated and the surface that disperses frequency differs largely from those of common optical crystals. For instance, there has been a report in H. Kosaka et al. Phys. Rev. B 58, R10099 (1998); H Kosaka et al. Appl. Phys. Lett. 74, 1212 (1999); H Kosaka et al. Appl. Phys. Lett. 74, 1370 (1999) (Non-Patent Document 1), saying that a large optical deflection called "super-prism effect" is observed by selecting a light of an appropriate wave length for the surface that disperses frequency and formed by the wave number of the photonic band.

As specific examples of the optical switch using the photonic crystals, for example, there are those technologies that are disclosed in Japanese Patent Application Laid-Open No. 2002-350908 (Patent Document 2), Japanese Patent Application Laid-Open No. 2002-303836 (Patent Document 3), and Japanese Patent Application Laid-Open No. 2003-215367 (Patent Document 4).

In Patent Document 2, there is disclosed an invention of a principle that a deflection angle is adjustable by applying an energy such as voltage to photonic crystals.

In Patent Document 3, there is disclosed an invention that forms an optical path by forming a line defect waveguide in photonic crystals composing a core of an optical waveguide.

In Patent Document 4, similarly to Patent Document 3, there is disclosed an invention in which the core of the optical waveguide is formed by photonic crystals and a portion not satisfying the alignment having the above-described periodical structure is formed in the photonic crystals to thereby use the portion as an optical path.

2. Description of the Related Art

In the optical switches employing the above-described conventional photonic crystals, it is possible to delineate an optical path and to obtain a large deflection angle, however, there is a problem that the precision of adjusting the deflection angle is not so high. The recent demands for high-speed driving and multichannel in the optical switches are increasing further, and in order to sufficiently respond to the demands, the precision of adjusting the deflection angle needs to be improved substantially, and thereby a technology for that purpose is sought for under the present set of circumstances.

SUMMARY OF THE INVENTION

The present invention has been made in view of the above-described problems and an object thereof is to provide an optical deflection element capable of deflecting a light at a desired large deflection angle using a photonic crystal and controlling the deflection angle within a wide angle range precisely and at high speed, and thereby contributing further to the downsizing and integration of devices.

Further, another object of the present invention is to provide a multichannel optical switch that operates at high speed and contributes largely to the downsizing and integration of the devices by using an optical deflection element capable of controlling an optical signal within a large desired angle range precisely and at high speed.

The optical deflection element according to the present invention is composed of: an optical waveguide made of an electrooptic material; a first optical deflector provided on the optical waveguide; and a second optical deflector provided forward of the first optical deflector by overpassing the first optical deflector in a light traveling direction and having a wider deflection angle range than the deflection angle range of the first optical deflector, in which the second optical deflector includes a first photonic crystal structure structured by plural kinds of substances that have different refractive indexes and are aligned periodically and a control electrode controlling the deflection angle of a light caused by the first photonic crystal structure by adjusting voltage applied to the first photonic crystal structure.

An optical switch according to the present invention is composed of: a plurality of input channels inputting optical signals; a plurality of optical deflection elements each of which is provided for respective the input channels; and a plurality of output channels outputting the optical signals, in which each of the optical deflection elements includes an optical waveguide made of an electrooptic material, a first optical deflector provided on the optical waveguide, a second optical deflector provided forward of the first optical deflector in a light traveling direction by overpassing the first optical deflector and having a wider deflection angle range than the deflection angle range of the first deflector, and in which the second optical deflector is provided with a first photonic crystal structure structured by plural kinds of substances that have different deflection indexes and are aligned periodically, and a control electrode controlling an effective refractive index of a light caused by the first photonic crystal structure by adjusting voltage to be applied to the first photonic crystal structure.

According to one embodiment of the present invention, there is further included a second photonic crystal structure provided in parallel with the light traveling direction in the region between the neighboring first optical deflectors, the second crystal structure being formed by plural kinds of substances having different refraction indexes and being aligned periodically.

BRIEF DESCRIPTION OF THE DRAWINGS

FIGS. 4A and 4B are schematic views showing a schematic configuration of an optical switch according to a second embodiment.

DETAILED DESCRIPTION OF THE PREFERRED EMBODIMENTS

Basic Gist of the Present Invention

Figure 1A:
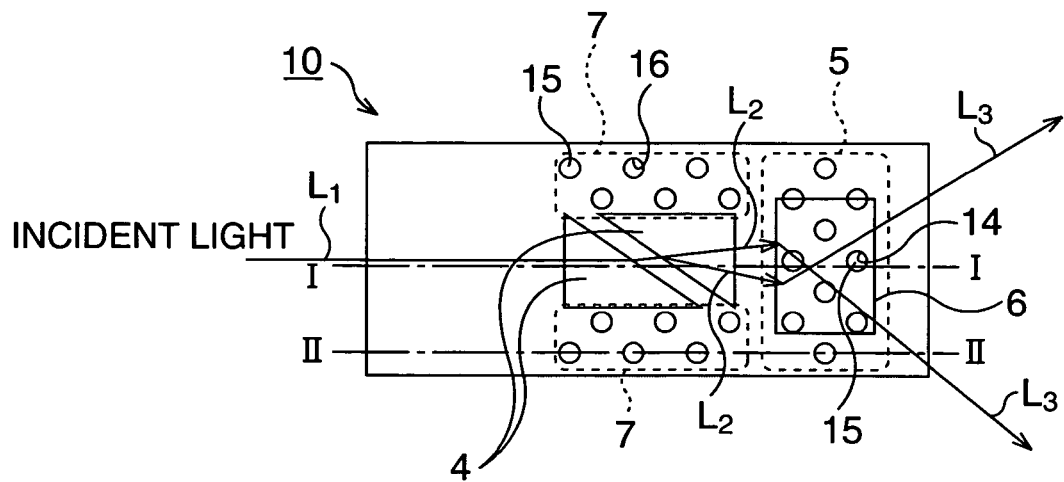
FIGS. 1A to 1C are views showing main components of an optical deflection element according to a first embodiment.

With an aim to deflect a light at a wide deflection angle and to control the deflection angle within a wide range precisely and at high speed, the present inventor has devised to provide two types of deflectors disposed in series in the light traveling direction so that the deflectors have a dual system for controlling the optical deflection precisely within a wide angle range. As a specific example, a prism electrode is used as a first optical deflector, and a photonic crystal (a first photonic crystal structure) and a control electrode adjusting voltage to be applied to the photonic crystal to thereby control an effective refractive index of a light caused by the photonic crystal is used as a second optical deflector.

According to the present invention, a material (electrooptic material) having an electrooptic effect (an effect of changing the refractive index that is caused when an electric field is applied to a dielectric crystal and a ferroelectric crystal) is used for an optical waveguide, and a first optical deflector and a second optical deflector are disposed in this order in the light traveling direction. First, the optical deflection is slightly adjusted by the deflector of a first step (first optical deflector), and thereafter the optical deflection is adjusted within the large deflection angle range by the deflector of a second step (second optical deflector). For instance, the optical deflection by a prism electrode is small in deflection angle. As an optical deflection of the first step, with the use for example of the prism electrode for the first optical deflector, an incident light is deflected to right or left at a small angle. Subsequently, as an optical deflection of the second step, with the use of a first photonic crystal structure as the second optical deflector, the light slightly deflected to right or left by the first optical deflector can be deflected more larger to right or left. At this time, in the second optical deflector, a desired voltage is applied from the control electrode to the first photonic crystal structure. With this voltage application, a photonic band gap inside a photonic crystal is modulated, so that the deflection angle of a light can be changed desirably within the range of a large deflection angle by the photonic crystal.

The optical deflection caused by a super prism effect of the photonic crystal is extremely sensitive to the angle and wavelength of an incident light, so that the optical deflection becomes large in response to a slight angle of the incident light. Therefore, the photonic crystal by itself can obtain a large optical deflection angle, but cannot adjust the deflection angle precisely. In the present invention, by taking advantage of such a property of the photonic crystal positively, first, the incident light is deflected to right or left at a slight angle, and subsequently, the slight angle is deflected largely and precisely by the first photonic crystal structure while being adjusted by the control electrode. With such a deflection angle control, even if the wavelengths of the incident lights are not unique, the wavelength selectivity for causing the super prism effect is increased and the control of the optical deflection angle can be made precisely and at high speed.

Further, according to the present invention, there are disposed the photonic crystal structure and a second photonic crystal structure having a different periodical structure from that of the first photonic crystal structure. The second photonic crystal structure has a photonic band gap and thereby an optical path is focused, so that a highly-directed optical deflection control is enabled.

Still further, according to the present invention, the above-described optical deflection element is applied to an optical switch provided with a plurality of input and output channels. Specifically, the above-described optical deflection element is disposed for each of the input channels. Each of the optical deflection elements is provided with the first and second optical deflectors, and thereby, with the double adjustments of deflection angle, the deflection of optical signal can be controlled within the wide range of deflection angle precisely. In this case, the second photonic crystal structure is provided in the region between the input channels being adjacent to the optical path in parallel therewith, the optical path of an incident light signal is discriminated for each input channel, so that cross talks between the input channels are substantially reduced.

Specific Embodiments Adopting the Present Invention (First Embodiment)

In the present embodiment, a specific configuration of an optical deflection element adopting the present invention will be disclosed.

Figure 1B:
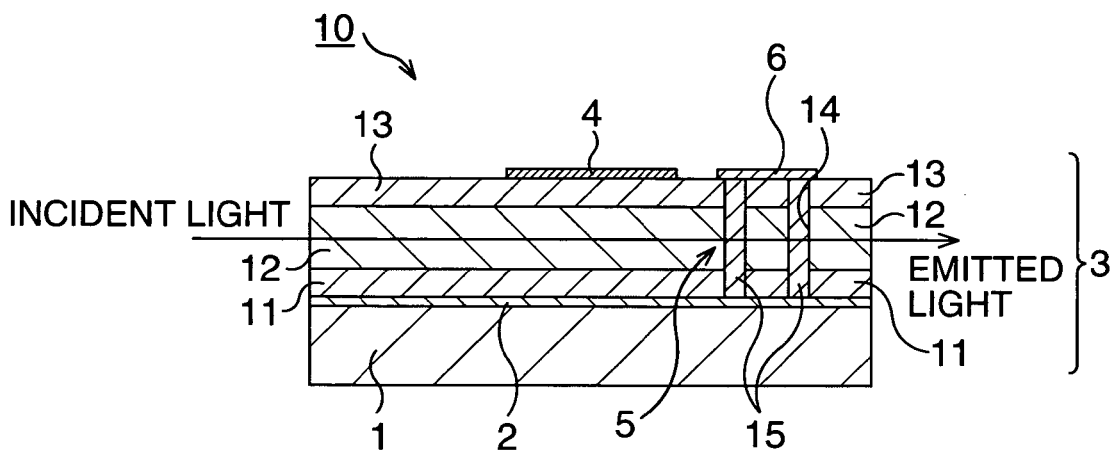
Figure 1C:
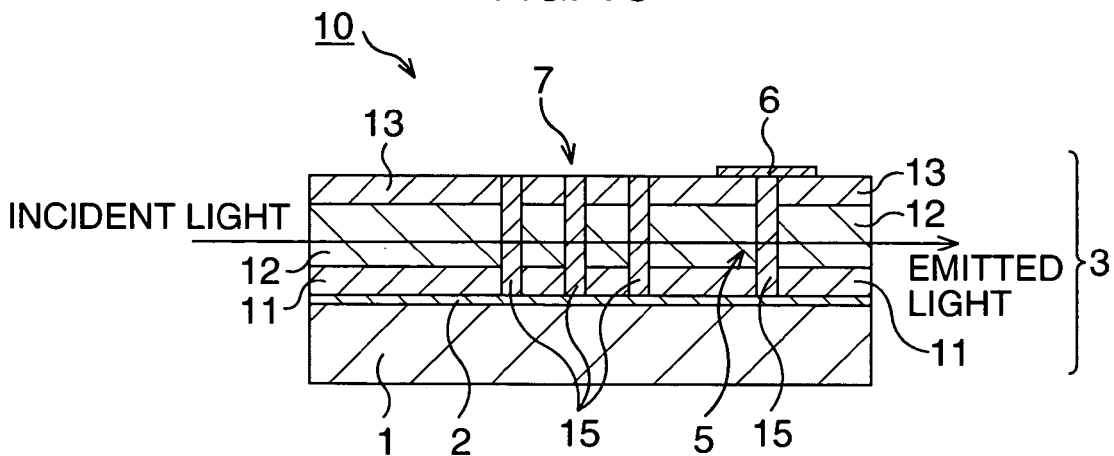

FIGS. 1A to 1C show main components of an optical deflection element according to a first embodiment, in which FIG. 1A is a schematic plan view, FIG. 1B is a schematic sectional view taken along the dashed line I—I in FIG. 1A, and FIG. 1C is a schematic sectional view taken along the dashed line II—II in FIG. 1A. Further, FIGS. 2A to 2G and FIGS. 3A to 3E are schematic sectional views (corresponding to the schematic sectional view taken along the dashed line I—I in FIG. 1A) showing the manufacturing method of the optical deflection element according to the first embodiment in the order of steps.

As shown in FIGS. 1A and 1B, an optical deflection element 10 of the present embodiment is configured to include an optical waveguide 3 made of an electrooptic material on an element substrate 1 via a counter electrode layer 2, a prism electrode 4 provided to confront the counter electrode layer 2 via the optical waveguide 3, a first photonic crystal structure 5 provided forward of the prism electrode 4 by passing therethrough in the light traveling direction, a control electrode 6 provided to confront the counter electrode layer 2 via the optical waveguide 3 on the first photonic crystal structure 5, second photonic crystal structures 7 provided in parallel with the light traveling direction and in the lateral direction of the prism electrode 4.

The optical waveguide 3 is a slab waveguide and is configured to sandwich a core layer 12, in which an optical path is formed, by and between a lower clad layer 11 and an upper clad layer 12. As an electrooptic material of the optical waveguide 3, perovskite ferroelectric materials of $BaTiO_3$, $Pb(Zr, Ti)O_3(PZT)$, $(Pb, La)TiO_3(PLT)$, $(Pb, La) (Zt, Ti)O_3$ (PLZT) exhibiting a large electric effect are preferable, however, $KH_2PO_4(KDP)$ having a tetragonal system, ilumenite type materials of $LiNbO_3$, $LiTaO_3$, and $KNbO_3$ of, and a tungsten bronze type material of $(Sr, Ba)Nb_2O_6(SBN)$ are also acceptable. From these materials, a material having an arbitrary refractive index is chosen to be used as a material of the optical waveguide 3.

The prism electrode 4 is structured by a pair of triangle electrodes disposed to face one another and functions as a first optical deflector.

The first photonic crystal structure 5 is composed of photonic crystals in which plural types of substances having different refractive indexes are periodically arranged. Here, plural through holes 14 are formed in the optical waveguide 3 in the direction orthogonal to the light traveling direction, these through holes 14 being filled with a material having a different refractive index from that of the electrooptic material of the optical waveguide 3, here, a transparent resin 15, and these two types of materials, namely the transparent resin 15 and the surrounding electrooptic material, are periodically arranged. In this case, in order to obtain the desired super prism effect, the periodical structure, namely, sizes, shapes, and arrangement periods of the throughholes 14 are adjusted appropriately. With the use of the transparent resin 15 as a filler of the through holes 14, a capability of withstanding voltage is improved as compared to an air of using no filler, so that electric discharge can be prevented. As a filler, any material having a different refractive index from that of the electrooptic material are allowed, and, for example, a silica or the like is also preferable.

The control electrode 6 is disposed so as to sandwich the first photonic crystal structure 5 with the counter electrode layer 2. The control electrode 6 together with the first photonic crystal structure 5 functions as a second optical deflector.

In the second photonic crystal structures 7, plural through holes 16 are formed in the optical waveguide 3 in the direction orthogonal to the light traveling direction and these through holes 16 are filled with a material having a different refractive index from that of the electrooptic material, here, a transparent resin 15, and these two types of materials, namely the transparent resin 15 and the surrounding electrooptic material, are periodically arranged. In this case, the second photonic crystal structures 7 has a different periodical structure (sizes, shapes, and arrangement period of the through holes 16) from that of the first photonic crystal structure 5, here, the periodical structure that forms a photonic band gap, so that the optical path is focused and thereby the highly-directed optical deflection control is enabled.

In this optical deflection element 10, an optical deflection is performed by two steps. First, an deflective light L1 enters into the prism electrode 4, a predetermined voltage is applied between this prism electrode 4 and the counter electrode layer 2, with this applied voltage, a refractive index change of a prism type occurs to thereby deflect the deflective light L1 to right or left at a slight angle to make it a first deflective light $L_2$ (needless to say, the deflective light L1 may be advanced directly without deflecting to any direction). In the example shown in the drawings, respective first deflective lights $L_2$ deflecting to both the right and left (in both upward and downward directions with respect to the dashed line I—I in FIG. 1) are shown. At this time, the second photonic crystal structures 7 are provided on the lateral sides of the prism electrode 4, and the optical path is focused into the prism electrode 4 caused by a photonic band gap that allows no light to exist therein.

The first deflective light $L_2$ passed through the prism electrode 4 enters into the first photonic crystal structure 5. The first photonic crystal structure 5 is applied predetermined voltage that is adjusted by the control electrode 6 between the control electrode 6 and the counter electrode layer 2. With the voltage adjustment, the photonic band gap of the first photonic crystal structure 5 is modulated, and the first deflective light $L_2$ deflected at only a slight angle is controlled precisely to deflect at a desired deflection angle within the wide deflection angle range caused by the photonic crystal to thereby be emitted as a second deflective light $L_3$. In the example shown in the drawings, the respective second deflective lights $L_3$ originated from the first deflective light $L_2$ and largely deflected rightward and leftward are shown, respectively.

Here, a manufacturing method of the optical deflection element 10 according to the present embodiment will be described with FIGS. 2A to 2G and FIGS. 3A to 3E.

Figure 2A:
FIGS. 2A to 2G are schematic sectional views showing a manufacturing method of the optical deflection element according to the first embodiment in the order of steps.

First, as shown in FIG. 2A, for example, an element substrate 1 made of $SrTiO_3(STO)$ or MgO is prepared and a counter electrode layer 2 is formed on the element substrate 1.

Figure 2B:

Specifically, as shown in FIG. 2B, an oxide film for example of SRO, or the like, or a metal film of Pt, or the like is deposited on the substrate 1 by sputtering to form the counter electrode layer 2. In this case, it is alternatively possible to use a conductive single crystal substrate of STO or the like that is added Nb, La, or the like, as the substrate 1, by omitting the formation of the counter electrode layer 2.

Subsequently, a lower clad layer 11 is formed on the counter electrode layer 2.

Figure 2C:
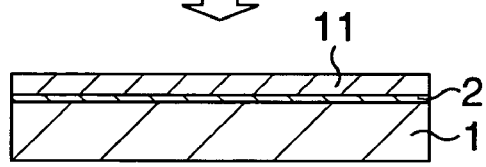

Specifically, as shown in FIG. 2C, the lower clad layer 11 is formed on the counter electrode layer 2 such that, as an example, a PLZT (9/65/35) film being a ferroelectric film is epitaxially grown up to have a film thickness of approximately 2 μm for example by a sol-gel method. Incidentally, the film thickness of the PLZT film can be controlled by coating the counter electrode layer 2 with a precursor PLZT solution twice or more by a dip method or a spin-coat method.

Subsequently, a core layer 12 is formed on the lower clad layer 11 so as to be stacked thereon.

Figure 2D:
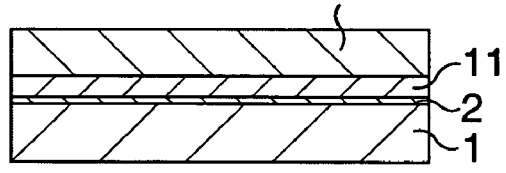

Specifically, as shown in FIG. 2D, a PZT (52/48) film is epitaxially grown up on the lower clad layer 11 to have a film thickness of approximately 3 μm for example by a sol-gel method to thereby form the core layer 12 to be stacked on the lower clad layer 11. Note that, similarly, the film thickness of the PZT film can be controlled by coating the lower clad layer 11 with a precursor PZT solution twice or more.

Subsequently, an upper clad layer 13 is formed on the core layer 12 to be stacked thereon.

Figure 2E:
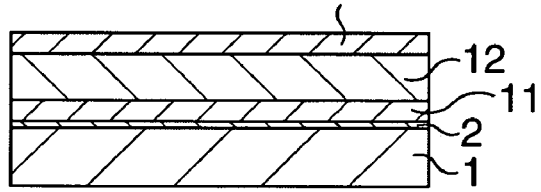

Specifically, as shown in FIG. 2E, a PLZT film is epitaxially grown up on the core layer 12 to have a film thickness of approximately 2 μm for example by a sol-gel method to thereby form the upper clad layer 13 to be stacked thereon. Note that, similarly, the film thickness of the PLZT film can be controlled by coating the core layer 12 with the precursor PLZT solution twice or more. At this time, an optical waveguide 3 is formed by the lower clad layer 11, the core layer 12, and the upper clad layer 13 that are layered. In the above, the case where the optical waveguide 3 made of an electrooptic material is formed by a sol-gel method has been described, however, any ferroelectric film formation process such as a sputtering, a pulse laser deposition method, an aerosol method, a MOCVD method, or the like can be employed other than the sol-gel method.

Subsequently, plural through holes 14 of a first photonic crystal structure 5 and plural through holes 16 of a second photonic crystal structures 7 are formed by patterning. Note that the drawings show only the through hole 14 corresponding to the position of the cross-section (the same note is applicable also hereinbelow).

Figure 2F:
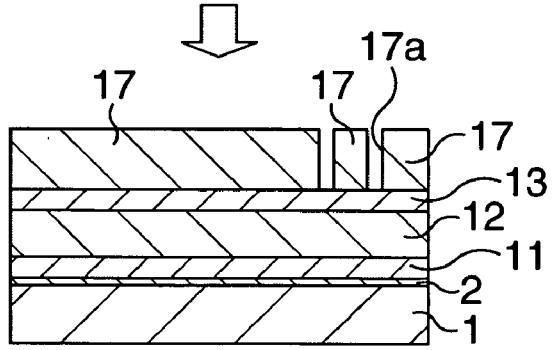
Figure 2G:
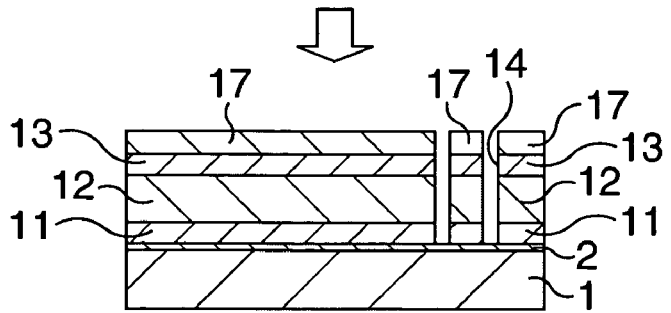
Figure 3A:
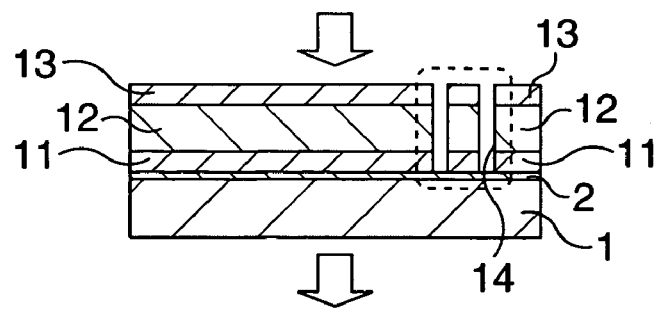
FIGS. 3A to 3E are schematic sectional views showing the manufacturing method of the optical deflection element according to the first embodiment following FIGS. 2A to 2G in the order of steps.

Specifically, first, as shown in FIG. 2F, for example, an electron beam resist 17 is coated on the optical waveguide 3, and respective patterns of the through holes 14, 16 are formed at predetermined positions of the electron beam resist 17 by an electron beam drawing, a development, and so on. Next, as shown in FIG. 2G, the optical waveguide 3 is etched to the extent that the surface of the counter electrode layer 2 is exposed by a dry etching method using an etching gas for example of $CF_4$ or $SF_6$. By this etching, the through holes 14, 16 copying the patterns of the electron beam resist 17 are formed in the optical waveguide 3. Then, the electron beam resist 17 is removed by ashing or the like, as shown in FIG. 3A.

Subsequently, the through holes 14, 16 are filled with a transparent resin 15.

Figure 3B:
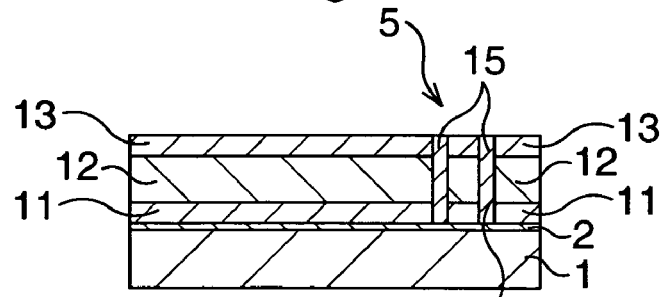

Specifically, as shown in FIG. 3B, as a transparent resin 15, for example, a fluorinated polyimide or the like is inserted into the through holes 14, 16 by a spin-coat method, a dip-coat method, or the like, and a transparent resin spilled over is removed for example by a reactive ion etching.

Through the above steps, the through holes 14, 16 are filled with the transparent resin 15, and first and second photonic structures 5, 7 having respective predetermined periodical structures are formed together with the surrounding electrooptic materials.

Subsequently, a prism electrode 4 and a control electrode 6 are formed on the optical waveguide 3 by patterning.

Figure 3C:
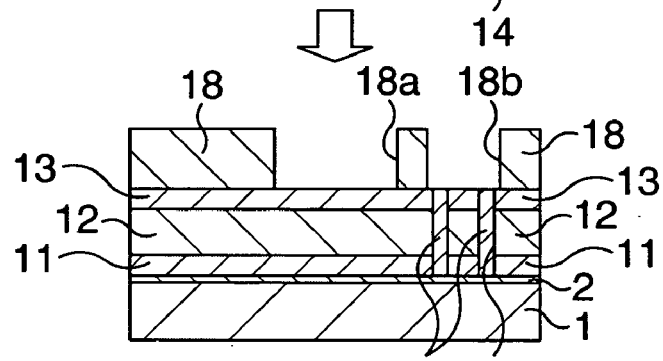
Figure 3D:
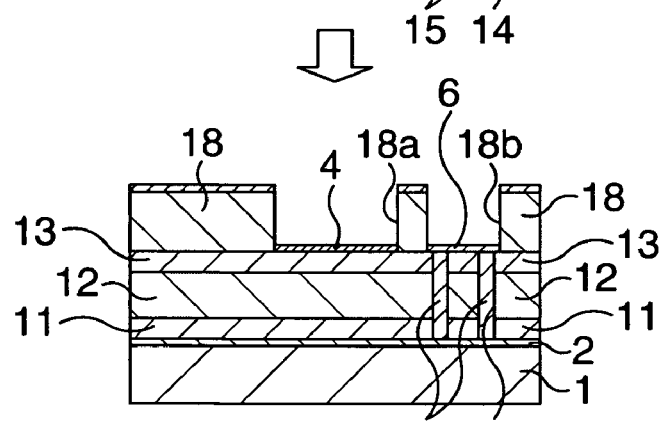
Figure 3E:
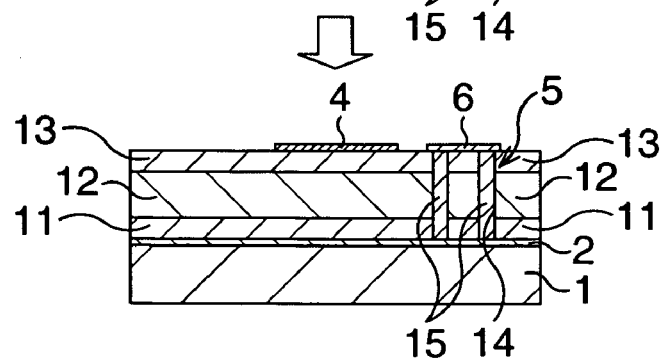

Specifically, as shown in FIG. 3C, first, for example, an electron beam resist 18 is coated on the optical waveguide 3, and respective patters 18a, 18b of the prism electrode 4 and the control electrode 6 are formed at predetermined positions of the electron beam resist 18 by an electron beam drawing, development, and so on. Next, as shown in FIG. 3D, an oxide film for example of SRO, $IrO_2$, or the like, or a metal film of Pt, Ti, or the like is deposited over the entire surface by sputtering. At this time, the oxide film or the metal film is deposited only on the portions on the optical waveguide 3 that are exposed by the respective patterns 18a, 18b. As shown in FIG. 3E, the electron beam resist 18 and the oxide film or the metal film on the electron beam resist 18 are removed by a lift-off effect to form the prism electrode 4 and the control electrode 6 by patterning.

Through the above steps and several post processes, the optical deflection element 10 of the present embodiment is completed.

It should be noted that the present invention is not limited to the above-described first embodiment. For instance, the thicknesses of the counter electrode layer 2, optical waveguide 3, prism electrode 4, and control electrode 6 have a certain degree of flexibility. Further, when the incident light does not satisfy the desired deflection angle of the prism electrode 4, the shape of the prism electrode 4 can be changed appropriately or the plural prism electrodes 4 may be arranged in series to have plural steps. Also, the respective periodical alignments of the first and second photonic crystal structures 5, 7 are shown as a tetragonal lattice alignment in the drawings, whereas they are not limited thereto, and a triangle lattice alignment and a honeycomb lattice alignment are also preferable.

As has been described in the above, according to the present embodiment, it is possible to deflect a light at a desired large deflection angle with a photonic crystal, and to control the deflection angle precisely and at high speed within a wide deflection angle range, so that the optical deflection element 10 contributing to further downsizing and integration of devices is realized.

(Second Embodiment)

According to the present embodiment, a specific configuration of an optical switch adopting the present invention will be disclosed.

FIGS. 4A and 4B show an outline of the configuration of the optical switch according to a second embodiment, in which FIG. 4A is a schematic plan view only of a main component section of the optical switch, and FIG. 4B is a schematic sectional view of the optical switch taken along the dashed line I—I in FIG. 4A. Note that the same composing members or the like as of the first embodiment are denoted by the same reference number, and detail descriptions thereof will be omitted.

An optical switch 20 according to the present embodiment is configured by disposing a plurality of optical deflection elements 10 according to the first embodiment in parallel. The optical switch 20 is an optical switch having an N×N alignment (N: an integer number equals to two or more, and N=4 in the case of the drawings) that is configured to have a main component section 21 provided with an optical deflection mechanism and a channel forming section 22 in which the main component section 21 is disposed.

The channel forming section 22 is configured to have a channel waveguide 32 on a channel substrate 31.

The channel waveguide 32 is configured to have a core layer 42, in which an optical path is to be formed, between a lower clad layer 41 and an upper clad layer 43, and is provided with optical signal input channels $I_1$ to $I_4$ and optical signal output channels $O_1$ to $O_4$. Each of the input channels $I_1$ to $I_4$ has a microlens 44 collimating a signal light at its top end portion, respectively, and the input channels $I_1$ to $I_4$ are arranged in parallel at the same intervals. Similarly, each of the output channels $O_1$ to $O_4$ has a microlens 44 at its rear end portion, respectively, and the output channels $O_1$ to $O_4$ are arranged in parallel at the same intervals. In the channel waveguide 32, there is formed a groove 45 in which the main component section 21 is mounted, and on such a portion of the surface of the channel substrate 31 that is exposed to the bottom of the groove 45, a variety of wiring layers 46 are formed by patterning.

In the channel forming section 22, a SiO$_2$ film having a film thickness of approximately 5 μm is formed by thermally oxidizing the surface of the channel substrate 31 composed for example of Si, and after that, for example, Ga is doped from the surface of the SiO$_2$ film into itself at a depth of approximately 3 μm, so that the lower clad layer 41 having a film thickness of approximately 2 μm and the core layer 42 having a film thickness of approximately 2 μm are formed. After that, by a sol-gel method, sputtering, or the like, a SiO$_2$ film having a film thickness of approximately 2 μm is formed on the core layer 42, so that the upper clad layer 43 is formed. Then, by using a CF$_4$ type gas as an etching gas, the upper clad layer 43, the core layer 42, and the lower clad layer 41 are subject to a dry etching, so that the groove 45 is formed by patterning.

The main component section 21 of the optical switch 20 is configured to include the optical deflection elements 10 according to the first embodiment so as to correspond to the input channels I$_1$ to I$_4$, respectively.

Each of the optical deflection elements 10 is configured to include an optical waveguide 3 on an element substrate 1 via a counter electrode layer 2, a prism electrode 4 on the optical waveguide 3, a first photonic crystal structure 5 provided forward of the prism electrode 4 by overpassing the prism electrode 4 in the light traveling direction, a control electrode 6 provided to confront the counter electrode layer 2 on the first photonic crystal structure 5 via the optical waveguide 3, and a second photonic crystal structure 7 provided in the lateral direction of the prism electrode 4 and in parallel with the light traveling direction.

Specifically, the prism electrodes 4, the first photonic crystal structures 5, and the control electrodes 6 are provided on the optical waveguide 3 respectively to correspond to the respective input channels I$_1$ to I$_4$, and the second photonic crystal structures 7 are provided in the lateral direction of the prism electrodes 4, here, in the region between the neighboring prism electrodes 4.

The main component section 21 configured as above is fitted into the groove 45 of the channel waveguide 32 by reversing the top surface and the bottom surface thereof so as to match the positions of the optical waveguide 3 and the channel waveguide 32, as shown in FIG. 4B, and the respective prism electrodes 4 and control electrodes 6 are connected to a predetermined wiring layer 46 for example by solder balls 47.

The optical switch 20 conducts a two-step optical deflection. Here, the case where an optical signal is inputted into the input channel I$_2$ will be described as an example.

First, an incident light L1 passed through the input channel I$_2$ enters into the prism electrode 4. A predetermined voltage is applied between the prism electrodes 4 and the counter electrode layers 2 and thereby the same voltage is applied to the prism electrodes 4, and with the voltage application, a prismatic refractive index change arises in the optical waveguide 3, and the incident light L$_1$ deflects rightward or leftward at a small angle to become a first deflection light L$_2$. In the example shown in the drawing, the signal lights deflected both rightward and leftward and the signal light going straight are shown as the first deflection lights L$_2$, respectively. At this time, second photonic crystal structures 7 are provided in the lateral direction of the prism electrodes 4, and no light cannot exist in the photonic band gap, so that the optical path of the signal light is discriminated and focused for each of the input channels I1 to I4 due to the photonic band gap, substantially reducing cross talks of the signal light between the neighboring input channels.

The first deflection light L$_2$ passed through the prism electrode 4 enters into the first photonic crystal structure 5. The predetermined voltage is applied by the control electrode 6 between the control electrode 6 and the counter electrode layer 2, thereby to the first photonic crystal structure 5, and with the voltage adjustment, the photonic band gap of the first photonic crystal structure 5 is modulated, so that the first deflection light L$_2$ deflected by the prism electrode 4 at just a small angle is precisely controlled to a desired deflection angle within the wide deflection angle range by the photonic crystal to thereby emitted as the second deflection light L3 and outputted to a desired output channel. In the example shown in the drawing, the signal lights originated from the first deflection light L$_2$ and largely deflected rightward and leftward to be outputted to the output channels O$_1$ and O$_4$ and that going straight to be outputted to the output channel O$_2$ are shown as the second deflection lights L$_3$, respectively.

It should be noted that the present invention is not limited to the above-described second embodiment. For instance, the optical deflection element is applicable to a laser printer, a bar-cord reader, or the like, in addition to the optical switch.

As has been described, according to the present embodiment, with the use of the optical deflection element 10 that enables to control an optical signal precisely at high speed within a desired wide deflection angle range, and by aligning two or more optical deflection elements 10 in parallel, a small-sized optical switch 20 capable of performing a high-speed switching operation is realized.

According to the present invention, an optical deflection element capable of deflecting a light at a desired wide angle and controlling the deflection angle within a wide deflection angle range precisely and at high speed with a photonic crystal, which thereby contributes to the downsizing and integration of devices, is realized.

According to the present invention, an optical switch capable of performing a switching operation at high speed even if it is of a small size is realized by utilizing a plurality of optical deflection elements capable of controlling an optical signal within a desired large deflection angle range precisely and at high speed and by aligning the optical deflection elements in parallel.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An optical deflection element comprising:
   an optical waveguide made of an electrooptic material;
   a first optical deflector provided on said optical waveguide; and
   a second optical deflector provided forward of said first optical deflector by overpassing said first optical deflector in a light traveling direction and having a wider deflection angle range than the deflection angle range of said first optical deflector,
   wherein said second optical deflector includes a first photonic crystal structure having a first periodical structure and a control electrode controlling the deflection angle of a light caused by said first photonic crystal structure by adjusting voltage applied to said first photonic crystal structure, further comprising a second photonic crystal structure having a second periodical structure different from the first periodical structure, the second photonic crystal structure provided in a lateral direction of said first optical deflector and structured by plural kinds of substances that have different refractive indexes and are aligned periodically.

2. The optical deflection element according to claim 1, wherein said first optical deflector is a prism electrode.

3. The optical deflection element according to claim 2; further comprising a counter electrode provided to confront said control electrode via said waveguide,
wherein said prism electrode and said control electrode apply voltage between said prism electrode and said control electrode and said counter electrode, respectively.

4. An optical deflection element comprising:
an optical waveguide made of an electro optic material;
a first optical deflector provided on said optical waveguide; and
a second optical deflector provided forward of said first optical deflector by overpassing said first optical deflector in a light traveling direction and having a wider deflection angle range than the deflection angle range of said first optical deflector,
wherein said second optical deflector includes a first photonic crystal structure structured by plural kinds of substances that have different refractive indexes and are aligned periodically and a control electrode controlling the deflection angle of a light caused by said first photonic crystal structure by adjusting voltage applied to said first photonic crystal structure, further comprising a second photonic crystal structure provided in a lateral direction of said first optical deflector and structured by plural kinds of substances that have different refractive indexes and are aligned periodically.

5. The optical deflection element according to claim 4, wherein said second photonic crystal structure has a periodical structure that is different from the periodical structure of said first photonic crystal structure.

6. The optical deflection element according to claim 4, wherein at least a part of said second photonic crystal structure is made of a ferroelectric material.

7. The optical deflection element according to claim 4, wherein at least a part of said second photonic crystal structure is made of a transparent resin.

8. The optical deflection element according to claim 1, wherein at least a part of said first photonic crystal structure is made of a ferroelectric material.

9. The optical deflection element according to claim 1, wherein at least a part of said first photonic crystal structure is made of a transparent resin.

10. An optical switch comprising:
a plurality of input channels inputting optical signals;
a plurality of optical deflection elements each of which is provided for respective said input channels; and
a plurality of output channels outputting the optical signals,
wherein each of said optical deflection elements includes an optical waveguide made of an electrooptic material;
a first optical deflector provided on said optical waveguide; a second optical deflector provided forward of said first optical deflector in a light traveling direction by overpassing said first optical deflector and having a wider deflection angle range than the deflection angle range of said first deflector,
wherein said second optical deflector is provided with a first photonic crystal structure having a first periodical structure; and a control electrode controlling the effective refractive index of a light caused by said first photonic crystal structure by adjusting voltage to be applied to said first photonic crystal structure, further comprising
a second photonic structure having a second periodical structure different from the first periodical structure, further comprising a second photonic crystal structure provided in parallel with the light traveling direction in a region between said neighboring first optical deflectors and structured by plural kinds of substances alianed periodically.

11. The optical switch according to claim 10, wherein said first optical deflector is a prism electrode.

12. The optical switch according to claim 11, further comprising a counter electrode provided to confront said control electrode via said waveguide,
wherein the prism electrode and said control electrode apply voltage between the prism electrode and said control electrode and said counter electrode, respectively.

13. An optical switch comprising:
a plurality of input channels inputting optical signals;
a plurality of optical deflection elements each of which is provided for respective said input channels; and
a plurality of output channels outputting the optical signals,
wherein each of said optical deflection elements includes an optical waveguide made of an electrooptic material;
a first optical deflector provided on said optical waveguide; a second optical deflector provided forward of said first optical deflector in a light traveling direction by overpassing said first optical deflector and having a wider deflection angle range than the deflection angle range of said first deflector,
wherein said second optical deflector is provided with a first photonic crystal structure structured by plural kinds of substances that have different deflection indexes and are aligned periodically; and a control electrode controlling the effective refractive index of a light caused by said first photonic crystal structure by adjusting voltage to be applied to said first photonic crystal structure, further comprising a second photonic crystal structure provided in parallel with the light traveling direction in a region between said neighboring first optical deflectors and structured by plural kinds of substances aligned periodically.

14. The optical switch according to claim 13, wherein said second photonic crystal structure has a periodical structure that is different from the periodical structure of said first photonic crystal structure.

15. The optical switch according to claim 13, wherein at least a part of said second photonic crystal structure is made of a ferroelectric material.

16. The optical switch according to claim 13, wherein at least a part of said second photonic crystal structure is made of a transparent resin.

17. The optical switch according to claim 10, wherein at least a part of said first photonic crystal structure is made of a ferroelectric material.

18. The optical switch according to claim 10, wherein at least a part of said first photonic crystal structure is made of a transparent resin.

* * * * *